United States Patent
Salas Moreno et al.

(10) Patent No.: US 12,349,017 B2
(45) Date of Patent: Jul. 1, 2025

(54) FAST HANDOVER FOR AN OPTICAL MULTI-CELL COMMUNICATION SYSTEM

(71) Applicant: SIGNIFY HOLDING B.V., Eindhoven (NL)

(72) Inventors: Antonio Salas Moreno, Eindhoven (NL); Tomas Garcia Haya, Eindhoven (NL); Octavia Martinez Gomez, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 361 days.

(21) Appl. No.: 17/801,444

(22) PCT Filed: Feb. 24, 2021

(86) PCT No.: PCT/EP2021/054513
§ 371 (c)(1),
(2) Date: Aug. 22, 2022

(87) PCT Pub. No.: WO2021/170622
PCT Pub. Date: Sep. 2, 2021

(65) Prior Publication Data
US 2023/0090182 A1  Mar. 23, 2023

Related U.S. Application Data

(60) Provisional application No. 62/982,127, filed on Feb. 27, 2020.

(30) Foreign Application Priority Data

Mar. 6, 2020 (EP) .................................. 20161368

(51) Int. Cl.
*H04W 36/00* (2009.01)
*H04B 10/114* (2013.01)
*H04B 10/116* (2013.01)

(52) U.S. Cl.
CPC .. *H04W 36/00835* (2018.08); *H04B 10/1149* (2013.01); *H04B 10/116* (2013.01);
(Continued)

(58) Field of Classification Search
CPC ....... H04W 36/00835; H04W 36/0085; H04W 36/00838; H04W 36/0016; H04B 10/1149; H04B 10/116
See application file for complete search history.

(56) References Cited

U.S. PATENT DOCUMENTS 9,288,525 B2   3/2016 Castor et al.
9,525,486 B2 * 12/2016 Poola ................. H04Q 11/0062
(Continued)

FOREIGN PATENT DOCUMENTS

GB        2571710 A  *  9/2019  ............ H03M 1/002
WO    2011137100 A1    11/2011
(Continued)

OTHER PUBLICATIONS

Quang-Hein Dang, et al., "Handover Procedure and Algorithm in Vehicle to Infrastructure Visible Light Communication", IEEE Access, vol. 5, Dec. 22, 2017, pp. 26466-26475.
(Continued)

*Primary Examiner* — Duc C Ho

(57) ABSTRACT

A method and apparatus for use in an optical wireless communication system that enable communication of data, e.g. LiFi, and wherein fast handover can be achieved by having neighboring access points (AP1, AP2) announce themselves using very short frames, that get picked up by user devices (EP1) that detect the identity of a neighbor access point (AP2) and then communicate this to the current access point (AP1) to share information on the user device (EP1) with its neighbor access point (AP2), so that the
(Continued)

neighbor access point (AP2) can be pre-configured to allocate resources and/or synchronize.

15 Claims, 5 Drawing Sheets

(52) U.S. Cl.
CPC . *H04W 36/0016* (2013.01); *H04W 36/00838* (2023.05); *H04W 36/0085* (2018.08)

(56) References Cited

U.S. PATENT DOCUMENTS

| | | |
|---|---|---|
| 9,615,302 B2 | 4/2017 | Zhi et al. |
| 2011/0019582 A1 | 1/2011 | Okmyanskiy et al. |
| 2018/0295548 A1 | 10/2018 | Kumar et al. |
| 2019/0261239 A1 | 8/2019 | Wang et al. |

FOREIGN PATENT DOCUMENTS

| | | | | |
|---|---|---|---|---|
| WO | WO-2017081207 A1 * | 5/2017 | ......... | H04B 10/1143 |
| WO | WO-2018019079 A1 * | 2/2018 | | |
| WO | 2018108294 A1 | 6/2018 | | |
| WO | 2018112895 A1 | 6/2018 | | |

OTHER PUBLICATIONS

Marwan Hammouda, et al., "Design of a Cognitive VLC Network with Illumination and Handover Requirements", Institute of Communications Technology, Hanover, Germany, Feb. 28, 2017, pp. 1-6.

* cited by examiner

FAST HANDOVER FOR AN OPTICAL MULTI-CELL COMMUNICATION SYSTEM

CROSS-REFERENCE TO PRIOR APPLICATIONS

This application is the U.S. National Phase application under 35 U.S.C. § 371 of International Application No. PCT/EP2021/054513, filed on Feb. 24, 2021, which claims the benefits of European Patent Application No. 20161368.4, filed on Mar. 6, 2020 and U.S. Patent Application No. 62/982,127, filed on Feb. 27, 2020. These applications are hereby incorporated by reference herein.

FIELD OF THE INVENTION

The invention relates to the field of communication in optical wireless networks, such as—but not limited to—Li-Fi networks, for use in various different applications for home, office, retail, hospitality and industry.

BACKGROUND OF THE INVENTION

Wireless optical networks, such as Li-Fi networks (named like Wi-Fi networks), enable mobile user devices (called end points (EP) in the following) like laptops, tablets, smartphones or the like to connect wirelessly to the internet. Wi-Fi achieves this using radio frequencies, but Li-Fi achieves this using the light spectrum which can enable unprecedented data transfer speed and bandwidth. Furthermore, it can be used in areas susceptible to electromagnetic interference. It's important to consider that wireless data is required for more than just our traditional connected devices—today televisions, speakers, headphones, printer's, virtual reality (VR) goggles and even refrigerators use wireless data to connect and perform essential communications. Radio frequency (RF) technology like Wi-Fi is running out of spectrum to support this digital revolution and Li-Fi can help power the next generation of immersive connectivity.

Based on the modulations, the information in the coded light can be detected using any suitable light sensor. This can be a dedicated photocell (point detector), an array of photo cells possibly with a lens, reflector, diffuser of phosphor converter, or a camera comprising an array of photocells (pixels) and a lens for forming an image on the array. E.g., the light sensor may be a dedicated photocell included in a dongle which plugs into the end point, or the sensor may be a general purpose (visible or infrared light) camera of the end point or an infrared detector initially designed for instance for 3D face recognition. Either way this may enable an application running on the end point to receive data via the light.

A communication signal can be embedded in a light signal emitted by an illumination source of an access device, such as an everyday luminaire, e.g. room lighting or outdoor lighting, thus allowing use of the illumination from the luminaires as a carrier of information. The light thus comprises both a visible illumination contribution for illuminating a target environment such as a room (typically the primary purpose of the light), and an embedded signal for providing information into the environment (typically considered a secondary function of the light). In such cases, the modulation may typically be performed at a high enough frequency to be beyond human perception, or at least such that any visible temporal light artefacts (e.g. flicker and/or strobe artefacts) are weak enough and at sufficiently high frequencies not to be noticeable or at least to be tolerable to humans. Thus, the embedded signal does not affect the primary illumination function, i.e., so the user only perceives the overall illumination and not the effect of the data being modulated into that illumination.

US patent application US2019/0261239 A1 discloses a method by a coordination node for controlling communication between LiFi access points and user equipment. The method comprises receiving peer connectivity reports from LiFi access points having at least partially overlapping coverage areas and developing a handover pathway data structure based on the peer connectivity reports, that identifies LiFi access points that can receive communication handover from other identifier LiFi access points. The method involves determining an identifier of a first access point providing service to user equipment and accessing the datastructure usinf the first access point identifier to determine a second LiFi access point to handover the service provisioning role to.

International patent application WO2011/137100 A1 discloses a visual light communication medium to provide communicative coupling between two or more devices. The communicative coupling supports a variety of functions which includes seamless transfer of mediu between the two or more devices.

In the following, the term "access point" is used to designate a logical access device that can be connected to one or more physical access devices (e.g. transceivers). Such a physical access device may typically be located at a luminaire and the logical access point may be connected to one or more physical access devices each located at one or more luminaires. However, compared to RF technology, the range of each access point is smaller, allowing a higher density of access devices. In such dense networks, interference handling can become complex if the overlapping areas of the access points are not well organized. Due to the small coverage area per access point and due to a need to prevent too much interference between access points, the overlapping areas in such systems are small. Therefore, a moving end point in such a network will require much faster transitions (e.g. handovers) between access points than for an RF network or other type of cellular network with large coverage area per access point and large overlapping areas.

SUMMARY OF THE INVENTION

It is an object of the present invention to provide an optical multi-cell communication system which allows faster transitions between access points.

This object is achieved by an apparatus as claimed in claim 1, by an access point as claimed in claim 10, by a luminaire as claimed in claim 11, by a method as claimed in claim 13, and by a computer program product as claimed in claim 15.

According to a first aspect which is directed to an apparatus for use in an access point, the apparatus for fast handover in an optical multi-cell communication system is provided, the apparatus being arranged for advertising presence of the access point in an optical multi-cell communication system by transmitting shortened frames without a payload portion in an allocated pre-defined part of a common channel of a frame cycle of a link layer or physical layer protocol, wherein the shortened frame contains an identifier of the advertising access point, pre-registering an end point, reserving transmission resources of the access point for the end point, and transmitting an acceptance message which includes timing information of the reserved transmission resources and an endpoint identifier to the end point, in response to a pre-registration request received from the end point.

Accordingly, dedicated shortened frames without a payload portion are provided in a dedicated common channel for neighbor detection and fast access to detected neighbors. These shortened frames can be picked up by end points to detect the identity of a neighboring access point, so that the neighboring access point can be pre-configured to allocate resources and allow fast handover at a later point in time and whereby, resources are pre-reserved prior to handover to thereby allow fast handover at a later point in time.

According to a first option of the first aspect, the apparatus may be arranged for transmitting the shortened frame in every frame cycle. Thereby, a very fast detecting of a neighboring access point within a single cycle of the signaling frame can be achieved.

According to a second option of the first aspect, which may be combined with the first option of the first aspect, the apparatus may be arranged for transmitting the shortened frame in the common channel and a default frame for medium access planning followed by an active frame for medium access planning in a different channel of the frame cycle. This provides the advantage that an existing signaling structure with default and active medium access planning flames (e.g. MAP-D and MAP-A frames of the MAC protocol) can be used for implementing the desired fast handover.

According to a third option of the first aspect, which may be combined with the first or second option of the first aspect, the allocated pre-defined part of the common channel of the frame cycle may be reserved for the access point. Thereby, default signaling capacity is allocated to each access point to ensure that individual advertisements are not blocked.

According to a fourth option of the first aspect, which may be combined with any one of the first to third options of the first aspect, the acceptance message may comprise an endpoint identifier of the end point assigned by the access point. This measure ensures that the end point can be identified in a later handover process.

According to a fifth option of the first aspect, which can be combined with any one of the first to fourth options of the first aspect, the apparatus may be arranged for removing the pre-registration of the end point at the access point after a predetermined time period. Thereby, it can be ensured that sufficient resources are kept for new pre-registrations to enable fast handovers for new endpoints.

According to a sixth option of the first aspect, which can be combined with any one of the first to fifth options of the first aspect, the apparatus may be arranged for prioritizing reservation of transmission resources by allocating a higher priority to end points already registered at the access point and to non-registered end points requesting entry in a domain of the access point and a lower priority to a pre-registrations of end points, wherein a higher priority is allocated to a newer pre-registration request than to an older pre-registration request. Thus, fast handover can be provided while still keeping sufficient transmission resources for registered and newly entering end points.

According to a further option which can be combined with any option of the first aspect, the shortened frame may be restricted to a preamble and a header which contains an identifier of the advertising access point. Thereby, the length of the shortened frame can be minimized to maximize the available resources allocated to the access points in the common channel.

According to a still further option which can be combined with any option of the first aspect, the shortened frame may be a shortened default medium access planning frame of a MAC protocol. Thus, an existing signaling frame of the MAC protocol can be used for the desired fast handover.

According to a still further option which can be combined with any option of the first aspect, the active medium access planning frame comprises scheduling information for transmission opportunities. Thereby, the existing active medium access planning frame can be used for signaling scheduling information for fast handover.

According to a still further option which can be combined with any option of the first aspect, the common channel of the shortened frame may be separated from normal data traffic in the frame cycle. This measure ensures that fast handover cannot be blocked or interfered by normal data traffic.

According to a second aspect, an access point for providing access to an optical multi-cell communication system is provided, the access point comprising an apparatus according to the first aspect and any one of the above options of the first aspect.

According to a third aspect, a luminaire is provided, the luminaire comprising at least one access point according to the second aspect.

According to a fourth aspect, a system is provided for fast handover in an optical multi-cell communication system, the system comprising: a plurality of access points according to the second aspect.

According to a fifth aspect which is directed to method at an access point, a method of allowing a fast handover in an optical multi-cell communication system is provided, the method comprising the access point: advertising presence of an access point in an optical multi-cell communication system by transmitting shortened frames without a payload portion in an allocated pre-defined part of a common channel of a frame cycle of a link layer or physical layer protocol, wherein the shortened frame contains an identifier of the advertising access point, pre-registering an end point, reserving transmission resources of the access point for the end point, and transmitting an acceptance message which includes timing information of the reserved transmission resources and an endpoint identifier to the end point, in response to a pre-registration request received from the end point.

According to a first option of the fifth aspect the methof further comprises the access point: prioritizing reservation of resources by allocating a higher priority to end points already registered at the access point and to non-registered end points requesting entry in a domain of the access point and a lower priority to a pre-registrations of end points, and wherein a higher priority is allocated to a newer pre-registration request than to an older pre-registration request.

According to a sixth aspect, a computer program product may be provided, which comprises code means for producing the steps of the above methods of the fifth aspect when run on a computer device.

It is noted that the above apparatuses may be implemented based on discrete hardware circuitries with discrete hardware components, integrated chips, or arrangements of chip modules, or based on signal processing devices or chips controlled by software routines or programs stored in memories, written on a computer readable media, or downloaded from a network, such as the Internet.

It shall be understood that the apparatus of claim 1, the access point of claim 10, the luminaire of claim 11, the method of claim 13, and the computer program product of claim 15 may have similar and/or identical preferred embodiments, in particular, as defined in the dependent claims.

It shall be understood that a preferred embodiment of the invention can also be any combination of the dependent claims or above embodiments with the respective independent claim.

These and other aspects of the invention will be apparent from and elucidated with reference to the embodiments described hereinafter.

DETAILED DESCRIPTION OF EMBODIMENTS

Various embodiments of the present invention are now described based on an optical multi-cell illumination and communication (LiFi) system.

Throughout the following, a luminaire as an access point is to be understood as any type of lighting unit or lighting fixture which comprises one or more light sources (including visible or non-visible (infrared (IR) or ultraviolet (UV)) light sources) for illumination and/or communication purposes and optionally other internal and/or external parts necessary for proper operation of the lighting, e.g., to distribute the light, to position and protect the light sources and ballast (where applicable), and to connect the luminaires to a power supply. Luminaires can be of the traditional type, such as a recessed or surface-mounted incandescent, fluorescent or other electric-discharge luminaires. Luminaires can also be of the non-traditional type, such as fiber optics with the light source at one location and the fiber core or "light pipe" at another.

Figure 1:
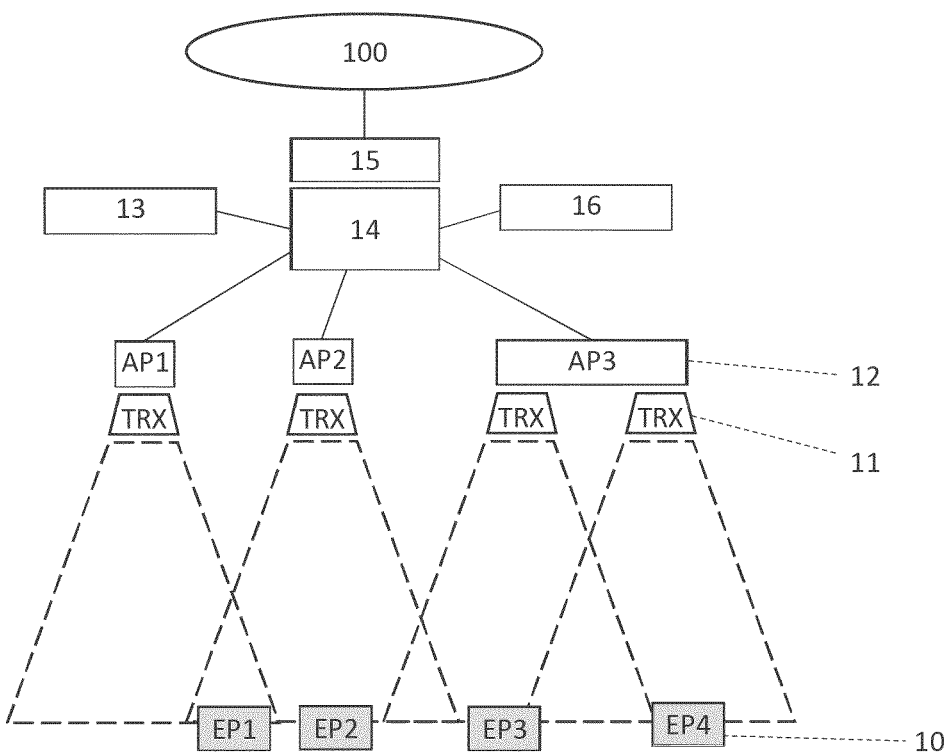
FIG. 1 shows schematically a block diagram of a LiFi network in which various embodiments can be implemented.

FIG. 1 shows schematically a block diagram of a LiFi network in which various embodiments can be implemented.

The LiFi network comprises multiple access-points (APs) AP1 to AP3 12, e.g. luminaires of a lighting system, connected via a switch (e.g. an Ethernet switch) 14, whereby each AP 12 controls one, or multiple transceivers (TRX) 11 (i.e. combined transmitters (optical emitters) and receivers (light sensors)) for optical communication towards end points (EP) EP1 to EP4 10, e.g., mobile user devices. Respective light beams generated by the TRXs 11 and defining coverage areas on the plane(s) of the EPs 10 are indicated by the dashed trapezoids in FIG. 1.

An AP 12 may apply a time-slot schedule for communicating with EP(s) 10 in its coverage area. Where the coverage areas of the TRXs 11 overlap (as shown for EP1 in FIG. 1), coordination of APs 12 is needed if the related TRXs 11 belong to different APs 12.

A LiFi controller 13 configured to manage the LiFi network is connected to the switch 14 and can provide such coordination for supporting interference handling and handover when one of the EPs 10 moves into and out of overlapping coverage areas of the APs 12. The controller 13 is connected via the switch 14 to the APs 12. The switch 13 may be connected to a synchronization server 16 for synchronization management and to a router 15 for connecting to a backplane or backhaul network (e.g. Ethernet) 100.

Medium access for the end points 10 may be scheduled by frame cycles of a data link layer protocol. In example embodiments, scheduling may be based on Media Access Control (MAC) cycles of the MAC protocol. These MAC cycles are continuously following one another and are divided into two or more time intervals, one or more of which are for domain management purposes, while other time intervals are assigned as transmission opportunities for different APs 12 or groups thereof. At least one of the time intervals allotted for domain management purposes may be assigned for transmission of a medium access plan (MAP). The domain management information transmitted in the MAP frame identifies the boundaries of the MAC cycle and includes a list of assigned transmission opportunities (e.g. dedicated time channels of the MAC cycle) for one or more of the following MAC cycles (e.g., the MAP transmitted in cycle N can describe the timing boundaries and transmission opportunities of cycle N+1).

A MAC cycle may start at a time published by a previous MAP frame and may end at the end of the last transmission opportunity scheduled for this MAC cycle as described in the MAP frame. The content of the MAC cycle may be determined based on communication resources and parameters required by different APs 12 for communications.

The controller 13 may determine provisions in the MAC cycle for the APs 12 to indicate their presence and thereby enable the EPs 10 to detect if they are in the coverage area of a neighboring AP. An EP 10 reports the detection of a neighboring AP to a local AP (e.g. the AP 12 to which the EP 10 is registered). The local AP then forwards these reports to the controller 13.

Depending on neighbor-AP detection reports received from EPs 10, the controller 13 may determine restrictions on the use of the MAC cycle for each AP 12 to handle interference by time division access.

There may be cases, where an EP 10 detects a neighboring AP and may depending on the received signal strength want to move its registration to the neighboring AP. Analog to specification IEEE802.11, the communication for this transition may be conducted directly with the neighboring AP, e.g., on a direct path (i.e. "over-the-air") or via the local AP of the distribution system (DS) (i.e. "over-the-DS"). In addition, the EP 10 may want the neighboring AP to reserve resources prior to the transition, e.g., based on a fast transition (FT) resource request protocol according to section 13 of the IEEE802.11 (2016) specification (Fast BSS transition).

To this end, two FT protocols are defined. These are an FT protocol which is executed when a transition to a target AP is made and a resource request is not required prior to the transition, and an FT resource request protocol which is executed when a resource request is required prior to the transition.

For a fast transition/handover of an EP 10 from its current AP to a target AP utilizing the FT protocols, message exchanges may be performed using the over-the-air approach (where the EP 10 communicates directly with the target AP using an IEEE 802.11 authentication with an FT authentication algorithm) or the over-the-DS approach (where the EP 10 communicates with the target AP via its current local AP). The communication between the EP 10 and the target AP may be carried in FT action frames between the EP 10 and its current local AP. Between the current AP and the target AP, the communication may be achieved via an encapsulation method, e.g., such as described in section 13.10.3 of the IEEE802.11 (2016) specification. The current local AP may convert between the two encapsulations.

Figure 2:
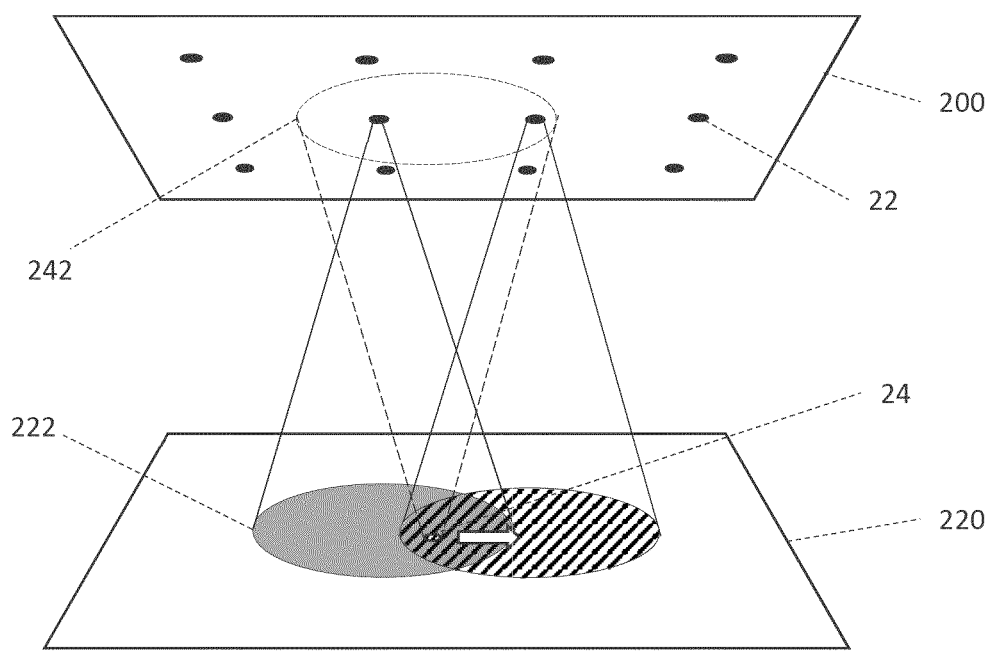
FIG. 2 shows schematically a LiFi infrastructure with first and second planar areas, in which various embodiments can be implemented.

FIG. 2 shows schematically a LiFi infrastructure with first and second planar areas 200, 220, in which various embodiments can be implemented.

The LiFi infrastructure comprises a plurality of LiFi infrastructure TRXs 22 of respective APs (e.g. luminaires of a lighting system) located in a first planar area 200 (e.g. a ceiling wall in a building). Each of the LiFi infrastructure TRXs 22 has an optical coverage area for transmitting and receiving LiFi signals projected on a second planar area 220 (e.g. a ground floor of a building), of which two projections as are shown in FIG. 2 as a hatched area and a grey area 222.

Furthermore, the LiFi infrastructure comprises a LiFi device TRX 24 of an EP located in the second planar area 220. The LiFi device TRX 24 moves in a direction indicated by the arrow and has an optical coverage area 242 for transmitting and receiving LiFi signals projected on the first planar area 200.

In the example of FIG. 2, the first planar area 200 and the second planar area 220 are supposed to be parallel.

Figure 3:
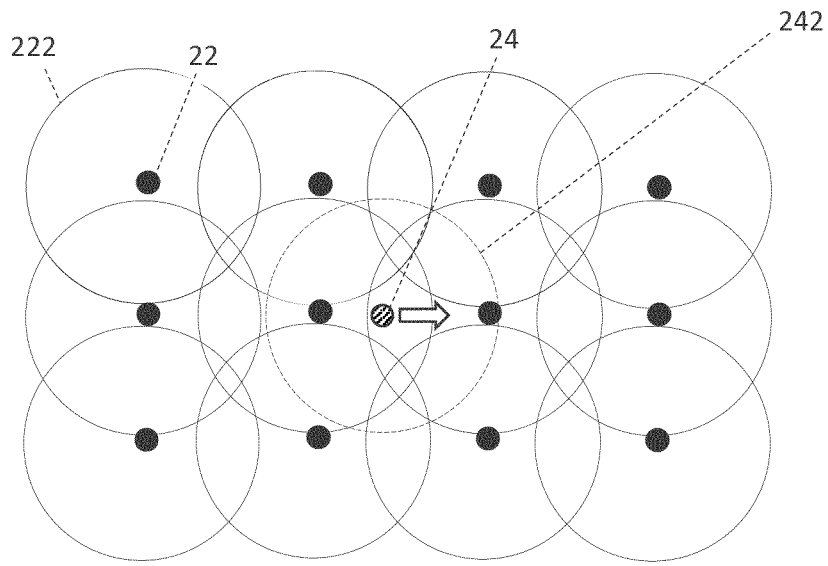
FIG. 3 shows schematically an illustration of a top-view representation of the LiFi infrastructure of FIG. 2.

FIG. 3 shows schematically an illustration of a top-view representation of the LiFi infrastructure of FIG. 2, in which the borders of coverage areas 222 are indicated with respective circles drawn around the plurality of LiFi infrastructure TRXs 22. Similarly, the coverage area 242 of the LiFi device TRX 24 of the moving EP is shown as a circle with a dashed line. As indicated in FIG. 3, overlapping areas of the coverage areas 222 of the LiFi infrastructure TRXs 22 and their APs are well organized in a regular pattern.

Due to the resultant small coverage area 222 per AP and in order to prevent too much interference between APs, the overlapping areas in the LiFi infrastructure are small. The moving EP in such a LiFi infrastructure will thus require much faster transitions between APs than for other cellular networks (e.g. RF networks) with large coverage area per AP and large overlapping areas.

According to various embodiments, the time for a transition between APs can be reduced and preferably minimized by anticipating an upcoming transition. In examples, this could be achieved by at least one of detecting a reduction of the received signal strength of the local AP, detecting a signal from a neighbor AP, or detection an increase of the signal of a neighbor AP.

In various embodiments, before the moving EP takes a decision on a transition to a neighboring AP, it may pre-register itself to the neighboring AP in order to prepare for the actual registration. Such a pre-registration may be executed when the EP detects a neighboring AP even when the received signal strength of the neighboring AP is weaker than that of its local AP.

In examples, the registration to an AP may be performed based on the steps defined in specifications ITU.G9960, G.9961 and ITU.G.9991 for LiFi networks. Since in LiFi networks the AP always acts as a domain master (DM), a DM can be regarded as the AP. The DM is a node that manages (coordinates) all other nodes of the same network domain (e.g., assigns bandwidth resources and manages user priorities) and may act as a relay node. For a registration, an EP may detect potential DM candidates, select a suitable DM candidate, perform coarse synchronization and initial payload detection, then perform fine synchronization and reception of an Active Medium Access Plan (MAP-A) frame for medium access planning and finally issue a registration request and wait for acceptance.

When an EP has visibility to one or more DMs (i.e. APs), the EP identifies all potential DM candidates. This may be made by configuring the receiver with a default indicator or seed, which is the one used by all nodes to transmit frames which need to be received by any node of the same domain or other domains with no previous information available. Each DM uses the default seed for generation of the preamble of a Default Medium Access Plan (MAP-D) frame transmission regardless of its medium type. The MAP-D frame is used for medium access planning and contains basic information which allows a node (e.g. the EP) to configure itself to receive the rest of frames of the domain. For this phase just receiving the header is enough, as it contains enough information to create a list of visible DMs.

The AP that is finally selected to register depends e.g. on the use of the technology. In general, an EP has a domain name configured and searches for an AP configured with the same domain name. In this case, once the EP has been able to synchronize with the AP, decode the payload and obtain the domain name of the AP, it checks if it matches the required one. If it does not, then the process is restarted and another AP is tried until a proper one is found. For every different AP that needs to be checked, the process gets longer.

Synchronization is a process to adjust EP's local clock to the AP's one. Small variations of the relative frequencies of these clocks degrade the signal-to-noise ratio (SNR) so that this synchronization needs to be performed as soon as possible and tracked continuously. Bad synchronization leads to errors towards the end of received frames and bad performance in general.

Frames like MAP-Ds and MAP-As may be transmitted in robust communication modes that allow their payload decoding even with a coarse synchronization between nodes. In example embodiments, the payload may be coded as RCM (Robust Communication Mode) transmission with NREP 3 and a FEC Rate ⅔ (cf. G.9960 ITU Standard for details).

Several fields obtained from the MAP-D payload can be used to decode the MAP-A frame and obtain additional information like the scheduling of transmission opportunities. Once the scheduling information is obtained, the MAC protocol allows the EP to start transmitting frames, which was not permitted until this point.

Once the EP is allowed to transmit, then it can send a registration request (e.g. ADM_NodeRegistrRequest.req message) to the selected AP. The registration request can be sent once a registration slot is found. This type of slot may not be present in all MAP cycles. If this is the case, then the message transmission is delayed until one is found.

Accordingly, the above registration procedure involves several hurdles for a fast transition or handover process.

A first hurdle to enable fast handover is the time needed for detecting neighboring APs, which depends on the reception of the MAP-D frame from such neighboring APs. The detection time might become large due to the facts that according to ITU.G.9961, the DM does not have to send MAP-D frames in every MAC-cycle, the MAP-D frame of a neighboring AP may interfere with on-going data of the local AP and may therefore not be recognized, the reception of the MAP-D frame requires a default seed which the EP does not use when registered to an AP, the inter-domain communication channel (IDCC) is a dedicated period to handle neighboring domains and based on contention access which does not suit for LiFi networks, because the APs do not see each other and therefore suffer from collisions on the IDCC, and the reservation of contention-free time for the MAP-D frame may reduce efficient use of the available time.

Moreover, a second hurdle is related to synchronization. An EP needs to synchronize to an AP before it can exchange frames. It can only do that after correct reception of a MAP-D frame, which may take too much time as mentioned above.

Finally, a third hurdle is related to registration. Before an EP can register to a neighboring AP, it needs to know the schedule (transmission opportunities) carried by the MAP-A frame. However, correct reception of a MAP-A frame may suffer from the same problems as for the MAP-D frame. In addition, it also depends on first receiving a MAP-D frame to get information needed for decoding MAP-A frame.

According to various embodiments, the transition or handover process is accelerated by advertising a shortened MAP-D frame (which may be called "SMAP-D") in a dedicated part of the MAC-cycle and by performing a pre-registration based on anticipated actions. More specifically, the SMAP-D may be located in a common channel (CC) of a MAC cycle, while the normal MAP-D and MAP-A frames are located somewhere else in the MAC cycle. The SMAP-D may only contain a frame-header carrying the identifier of the AP. The physical layer (PHY) frame header of ITU.G9960 specification contains a source node identifier (SID) and a destination node identifier (DID). In combination with a domain identifier (DOD) the nodes can be sufficiently identified in a local network. This header therefore suits to be applied as SMAP-D. The SMAP-D may be sent every MAC cycle e.g. with minimal colliding probability to neighboring APs. This enables an EP to quickly detect and report a neighboring AP for interference handling and pre-registration.

The MAP-D frame contains a payload carrying information for decoding the MAP-A frame. An EP needs information provided in the MAP-A frame before it can register to a detected neighboring AP. Thus, for fast registering, not only the MAP-A frame, but also the MAP-D frame is sent in every MAC-cycle. The MAP-D frame is mainly needed for initial registration to an AP and for re-registration e.g. when the EP has lost connection.

For the proposed fast handover process, the EP may detect the SMAP-D frame of a neighboring AP. It may however not yet be able to detect the MAP-D and/or MAP-A frames of the neighboring AP due to potential interference with its local AP. Then, after pre-registration, the EP deciding to handover can use the timing or scheduling information derived from the pre-registration to immediately decode the MAP-D and MAP-A frames. In the meantime, the LiFi controller having received a report from the EP on the detection of the neighboring AP, has coordinated the APs to ensure that the EP can receive the MAP-D and MAP-A frames of the neighboring AP without interference with its local AP.

As a result, the shortened frame (i.e. SMAP-D frame) allows a time-efficient detection of neighboring APs. It can be sent in the separated common channel with minimal interference and is short in order to not waste too much time. Moreover, the suggested pre-registration (i.e. a preliminary registration prior to handover) provides the timing information that enables immediate decoding of the MAP-D and MAP-A frames (containing the needed scheduling information) once the EP decides to register to a neighboring AP.

Figure 4:
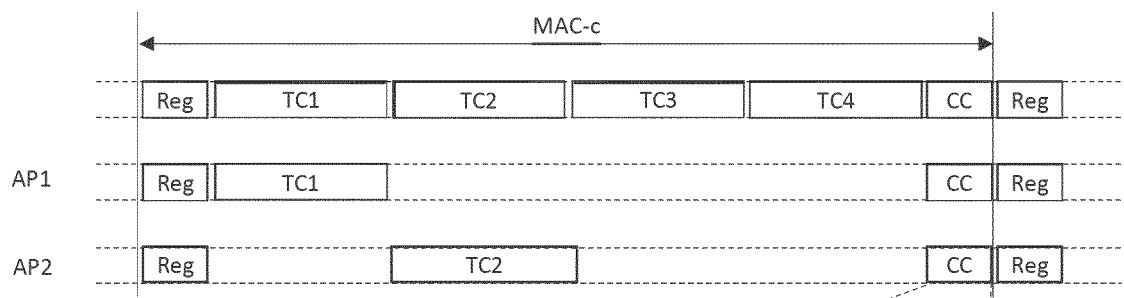
FIG. 4 shows schematically an example of aligned frame cycles for two access devices according to various embodiments.

FIG. 4 shows schematically an example of aligned frame cycles (i.e. MAC cycles) for two APs (i.e. AP1 and AP2) according to various embodiments.

In the example of FIG. 4, the MAC cycle (MAC-c) comprises a registration channel (Reg), four transmission channels (i.e. time channels TC1 to TC4) and a common channel (CC). To handle interference by coordinated time division access, the APs in the LiFi system have aligned MAC cycles. The common channel (CC) is reserved as a part of the MAC cycle for the APs to advertise their presence. It can be provided in each successive MAC cycle.

For the remaining part of the MAC cycle, the LiFi controller assigns a time channel (TC) to each AP. This assignment can be controlled by the LiFi controller so that neighboring APs have different time channels.

Furthermore, in examples, the LiFi controller may restrict each AP to allow only communication in the allocated time channels, but that would not be very efficient.

On other examples, according to a more advance approach, if an EP associated to a first AP (e.g. AP1) is in the coverage area of a second AP (e.g. AP2), the first AP restricts communication with the EP to the allocated time channel of the first AP and the second AP restricts communication with its associated EPs by excluding the time channel allocated to the first AP.

In the exemplary MAC cycle shown in FIG. 4, the LiFi controller has assigned a first time channel (TC1) to the first AP (AP1) and a second time channel (TC2) to the second AP (AP2). Assuming a first EP has been registered to the first AP and a second EP to the second AP, the LiFi controller may control the first AP to restrict its communication with the first EP to the first time channel and may control the second AP to restrict its communication with the second EP by excluding the first time channel.

To speed up the detection of neighboring APs, an AP may advertise its presence with a short MAP-D frame (SMAP-D) in the common channel (CC) at every MAC-cycle. This allows for better interference handling (e.g. no intermixing of normal data with management information) and for enabling the EP to apply the default seed for receiving the SMAP-D frame at the right moment. In order to make efficient use of the available time in the MAC cycle, the SMAP-D can be restricted to a preamble and a header, of which the latter contains an identifier of the AP.

Figure 5:
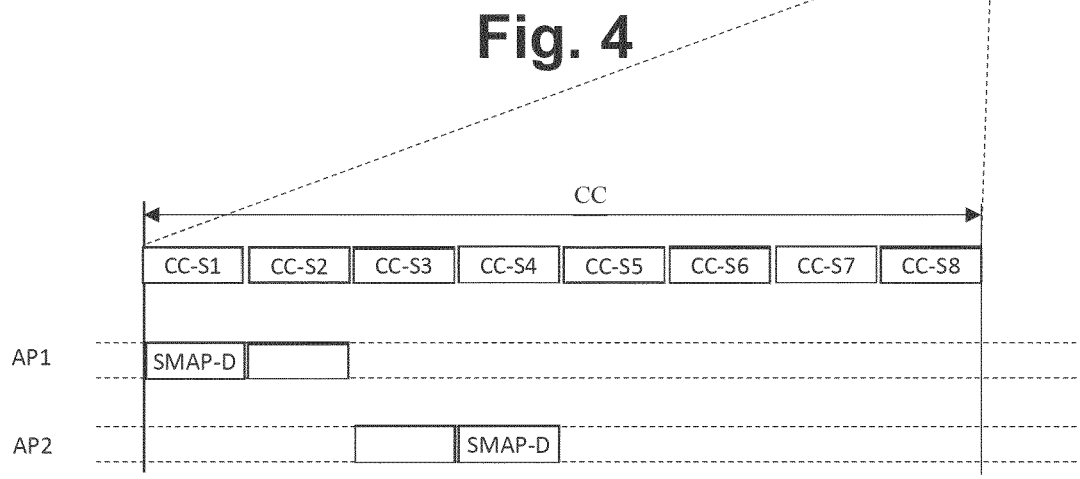
FIG. 5 shows schematically an example of a common channel with a slot allocation for the two access devices according to various embodiments.

FIG. 5 shows schematically an example of the common channel (CC) with an exemplary slot allocation for the two APs according to various embodiments. Thus, within the time period of the common channel, the LiFi controller may assign a sub period to each AP to reduce collisions of advertisements, where an AP may determine within its assigned sub period when, e.g. at random time, to send out its advertisement message.

In the example shown in FIG. 5, the common channel contains eight time slots CC-S1 . . . CC-S8, wherein the first two time slots CC-S1 and CC-S2 have been allocated to the first AP (AP 1) and the following two time slots CC-S3 and CC-S4 have been allocated to the second AP (AP 2). Note that this figure only shows an example. It is up to e.g. the LiFi controller to decide how many and which slots it allocates to which AP and it is up to an AP to decide in which of these allocated slots it sends the shortened SMAP-D frame.

Figure 6:
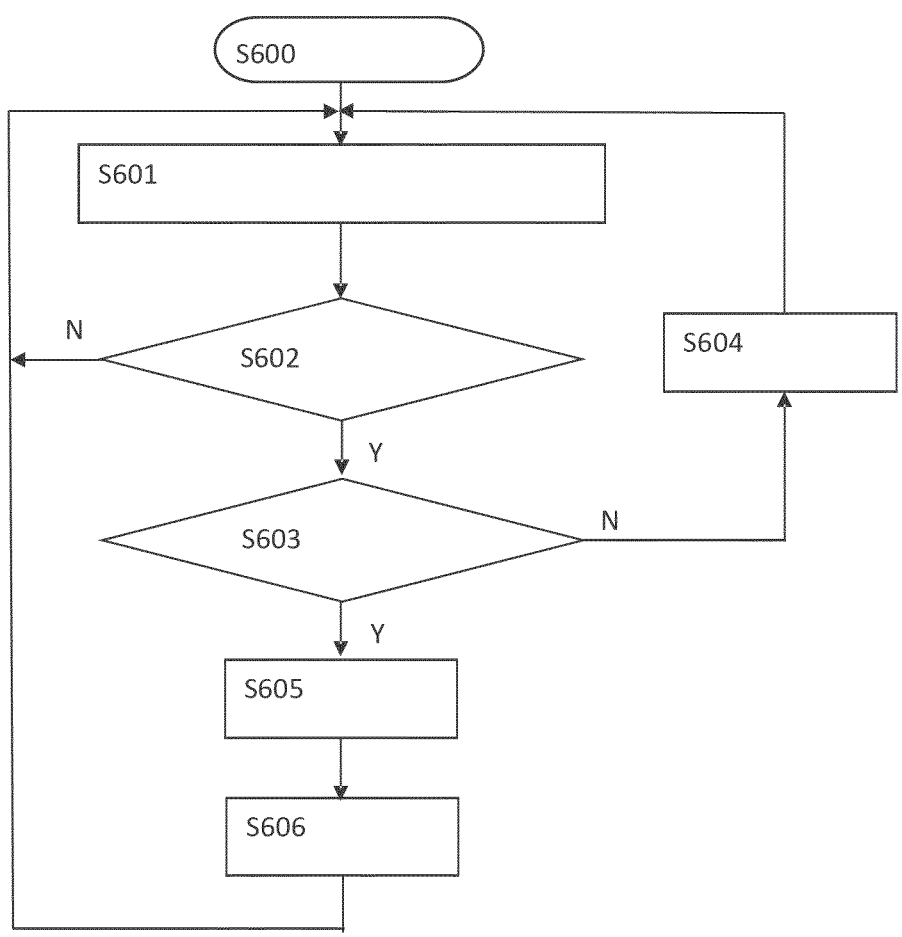
FIG. 6 shows a flow diagram of a pre-registration procedure of an access device according to various embodiments.

FIG. 6 shows a flow diagram of a pre-registration procedure of an AP according to various embodiments.

After the start of the procedure in step S600, the AP advertises its presence in step S601 by using the short SMAP-D frame (short message) in the allocated pre-defined part of the common channel separated from the normal data traffic in every MAC cycle. This allows an EP to detect a neighboring AP in a single MAC cycle without suffering from interference with data traffic.

To mitigate collisions and enable efficient use of the available time in the MAC cycle, the MAP-D frame is shortened to the SMAP-D frame which includes only the preamble and the physical layer (PHY) header, whereby the PHY-header carries the identifier of the AP.

In step S602, the AP checks whether a pre-registration request has been received. If not, the procedure jumps back to step S601. Otherwise, if a pre-registration request has been received in step S602, the AP checks in step S603 whether it can accept the pre-registration request (e.g. whether sufficient resources are available for the requesting EP and/or whether it is capable of performing a handover process). If not, the procedure branches off to step S604 where a reject message is transmitted to the requesting EP. Otherwise, if it is determined in step S603 that the pre-registration request can be accepted, the procedure continues with step S605 where resources (e.g. pre-allocated time slots) are reserved for the requesting EP. Then, in step S606, an acceptance message which includes the timing information of the reserved resources is transmitted to the EP. Finally, the procedure jumps back to step S601 and starts again.

Thus, in case of a successful pre-registration, the neighboring AP includes timing information in the acceptance message. Other information that may be included in the acceptance message may be at least one of an identifier of the EP, which the neighboring AP will assign, and a seed and/or preamble coding.

In examples, the EP may pre-register to a detected neighboring AP via the local AP, whereby the neighboring AP reserves corresponding resources for the requesting EP. In addition, the EP is informed about timing information of the neighboring AP to prepare for fast synchronisation to the neighboring AP.

In examples, according to the specification ITU.G.9961, the AP may broadcast the shortened MAP-D frame once every n MAC cycles and a MAP-A frame in every MAC cycle. To speed up the process of registration, the AP could send the MAP-D frame directly followed by a MAP-A frame in every MAC cycle.

Figure 7:
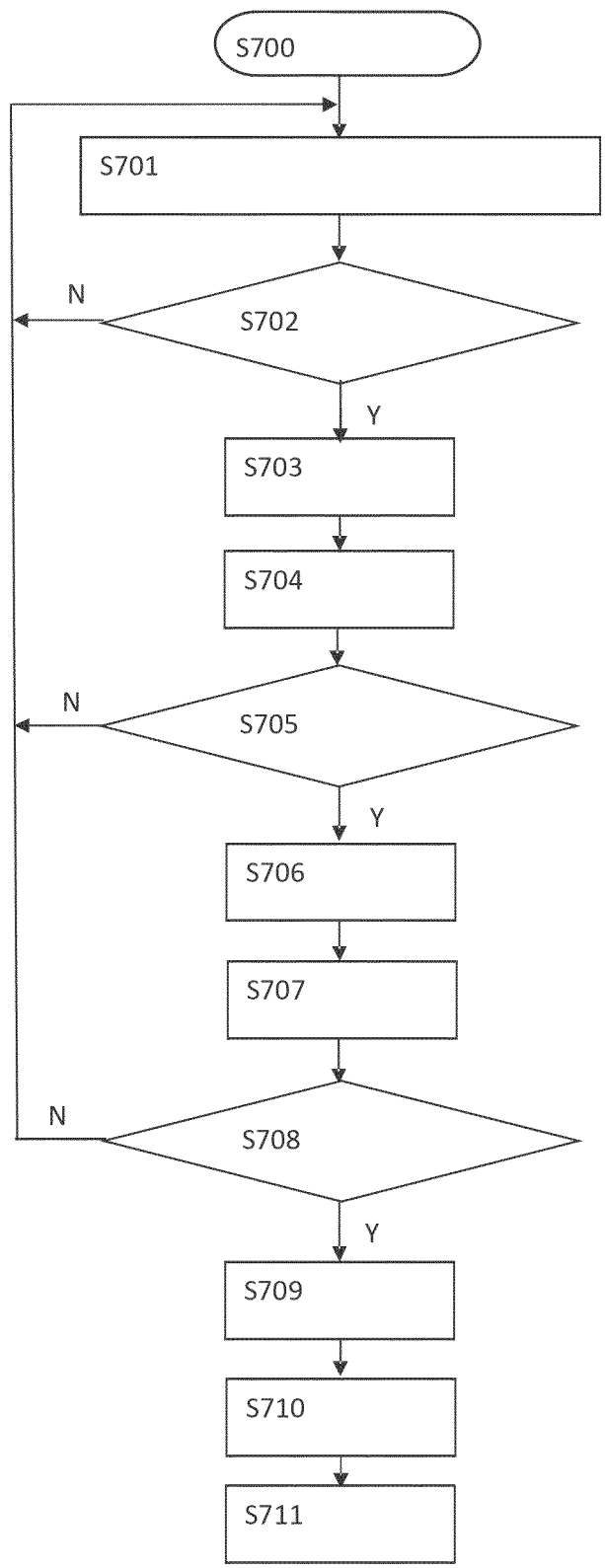
FIG. 7 shows a flow diagram of a pre-registration and fast handover procedure of a user device according to various embodiments.

FIG. 7 shows a flow diagram of a pre-registration and fast handover procedure of an EP according to various embodiments.

After the start of the procedure in step S700, the EP continuously searches in a loop of steps S702 and S701 for neighboring APs by monitoring for short messages (i.e. SMAP-D frames) in the common channel of the MAC cycle. If it detects in step S702 a neighboring AP, it reports this detection in step S703 to its local AP (i.e. the AP to which the EP is registered). The local AP then updates the LiFi controller accordingly and, in response thereto, the LiFi controller may update the restrictions for the APs to handle interference, like the allocation of time channels and the allocation of slots in the common channel.

Then, in step S704 the EP requests pre-registration to the neighboring AP via the local AP. The local AP may relay that pre-registration request either directly to the neighboring AP or via the LiFi controller. The neighboring AP replies with an accept or reject message to the EP via the local AP. If it accepts, it reserves corresponding resources for the EP. The neighboring AP may send the accept or reject message directly to the local AP or via the LiFi controller. Anyhow the local AP forwards this message to the EP.

In step S705, the EP checks whether it has received an acceptance message within a predetermined time period. If not, the procedure jumps back to step S701 and the EP searches for a new neighboring AP. Otherwise, if an acceptance message has been received in step S705, the EP stores the timing information of the acceptance message in step S706 to enable fast synchronization to the neighboring AP in a possible later handover.

Thereafter, in step S707, the EP checks the signal quality of neighboring APs e.g. by comparing the received signal strength indicator (RSSI) or another quality or error indicator of the SMAP-D frames received from neighboring APs in the common channel of the MAC cycle to decide in step S708 if it will handover to a selected neighboring AP.

If the EP decides in step S708 that it hands over to a neighboring AP, the EP applies in step S709 the timing or synchronization information it received in the acceptance message during pre-registration. Then, in step S710, the EP is able to seamlessly decode the MAP-D frame of the neighboring AP and may also derive the seed information enabling to decode the MAP-A frame that follows the MAP-D frame. Then, in step S711, the EP can start using the resources (e.g. time slots) pre-allocated by the neighboring AP in the MAC cycle for this EP for performing the fast handover.

The EP may further use a new identifier assigned by the neighboring AP and the seed and/or preamble coding used by the neighboring AP. The neighboring AP enables transfer of frames and may trigger the switch of the LiFi network to establish a new path to the EP.

It is noted that the EP may try to pre-register to all detected neighboring APs to anticipate a possible handover. The EP might be pre-registered in several APs simultaneously.

Figure 8:
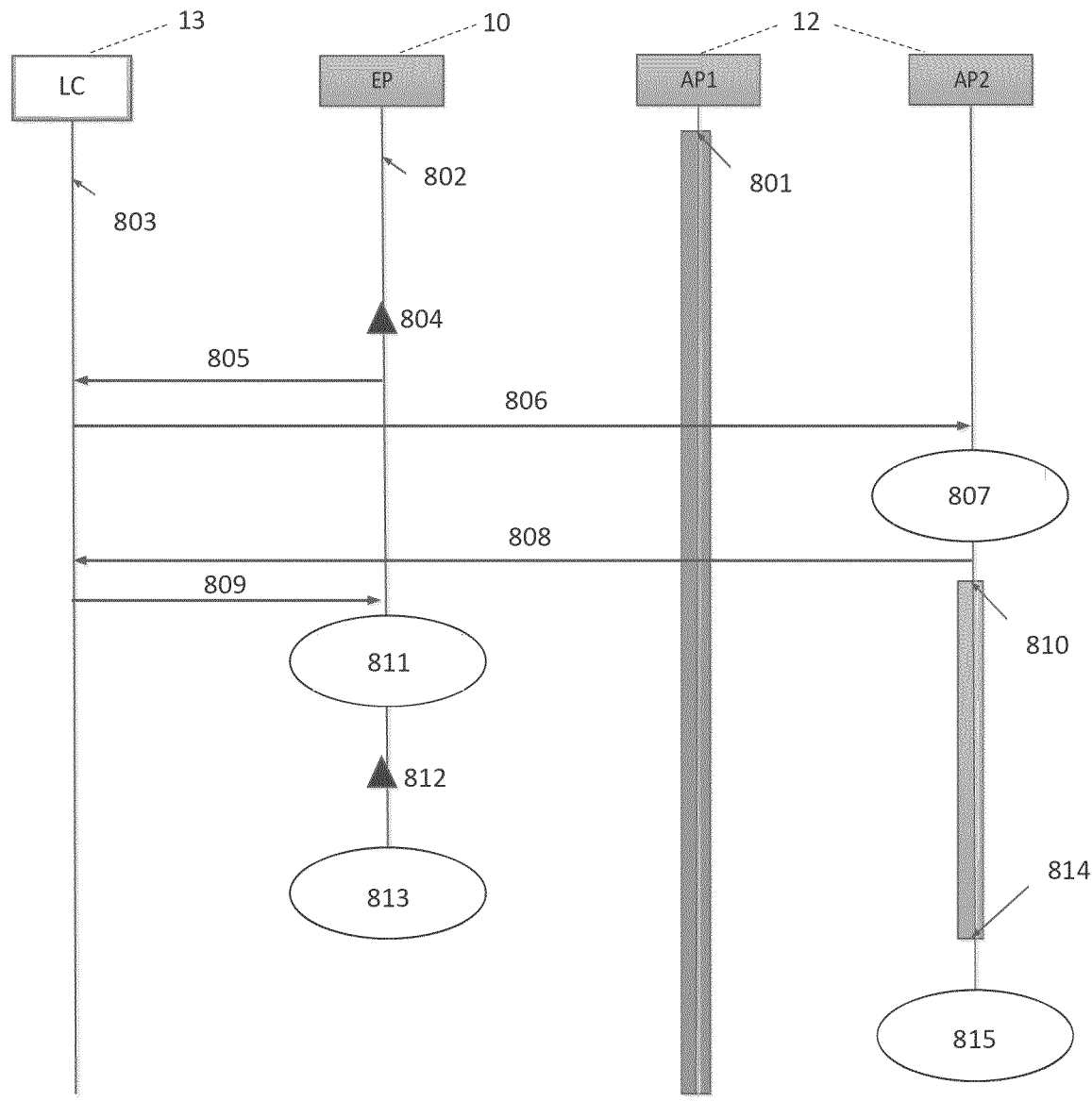
FIG. 8 shows schematically a pre-registration signaling and processing sequence in a LiFi network according to various embodiments.

FIG. 8 shows schematically a pre-registration process based on signaling and processing sequence in a LiFi network according to various embodiments.

In the signaling and processing sequence of FIG. 8, the vertical direction from the top to the bottom corresponds to the time axis, so that messages or processing times/steps shown above other messages or processing times/steps occur at an earlier time.

As indicated in the top portion of FIG. 8, the processing times and messages occur at or between the LiFi controller (LC) 13, an EP 10 and two APs (AP1, AP2) 12.

The sequence starts with a processing time 801 where the EP 10 is register to the first AP (AP1). Thereafter, at processing time 802, the EP 10 is registered to the first AP (i.e. DM1) but does not know about the neighboring second AP (AP2) yet. Furthermore, at processing time 803, the LiFi controller 13 knowns about the EP 10 being registered to the first AP.

Then, at processing time 804, the EP 10 detects the neighboring second AP. In response to this, the EP 10 sends a pre-registration request message 805 (e.g. LIFT_Fast- HandoverPrepare.req) for the neighboring second AP to the LC 13, e.g., by using the configuration and management protocol (LCMP) defined in the ITU-T G.9961 specification, which allows an external application entity to interact with the management of one or more ITU-T nodes in order to read/write parameters internal to the node. This request message is then relayed by the LC 13 as a request message 806 to the detected neighboring AP (AP2).

At processing step 807, in case of an acceptance of the pre-registration request, the detected neighboring AP prepares resources to accept the new node and pre-establishes connections. It may add the information locally but may avoid sending this information in topology packets (because this node (i.e. the requesting EP) is not in the domain yet).

Then, the neighboring AP sends a notification message 808 (e.g. LIFT_FastHandoverPrepare.cnf) to the LC 13 to indicate whether the request from the EP 10 is accepted (e.g. assigning a domain ID (DOD) and/or destination ID (DID)) or denied. In case of a pre-registration denial, the neighboring AP sends a code informing about the denial reason (e.g. no available resources or handover not supported (function-limited AP)).

The LC 13 relays this acceptance or denial notification as notification message 809 to the requesting EP 10. If accepted, the neighboring AP has resources ready for handover for the EP 10 at processing time 810, and the requesting EP 10 creates the necessary resources at processing time 811 for a possible link negotiation.

If the requesting EP 10 receives a denial indicating no available resources, the requesting EP 10 may retry pre-registration after a timeout. Otherwise, if the denial indicates that handover is not supported (i.e. the neighboring AP is a function-limited AP), the requesting EP 10 may mark this AP as non-capable for handover.

However, if the requesting EP 10 does not receive a response to the pre-registration request after a predetermined time period, then it may retry pre-registration after a timeout (e.g. 200 ms).

If the requesting EP 10 detects at processing time 812 that the power received from any neighboring AP is higher than that of the current neighboring AP then the EP 10 may free the created resources in processing step 813 and may start a handover process targeting a new AP which has already pre-registered the EP 10.

After a predetermined timeout at processing time 814, the selected neighboring AP may remove the pre-registration of the EP 10 due to ageing in processing step 815. Thereby, it is not necessary to issue a cancellation message. However, if such an ageing option is implemented, the requesting EP 10 may need to renew the pre-registration periodically.

In a subsequent handover process (not shown in FIG. 8) the EP may decide to change its configuration (e.g. DOD, DID, Seed) to a newly selected AP (new LiFi domain). Therefore, it may create new resources (e.g. transmissions and reception queues), change synchronization to be adjusted to new AP (ach AP informs about its MAP duration so clock deviation between current AP and neighbor AP can be calculated), enable a transmission path, and change from a synchronization phase to a tracking phase.

The neighbor AP may send fake transmission packets (e.g. Ethernet packets) with the source MAC address of devices connected to the EP (as previously known from pre-registration phase), so that the switch may change the port location of these MAC addresses. The AP may prioritize the resources assignment by allocating highest priority to its current slaves (i.e. EPs already registered in the AP), second highest priority to normal registrations (i.e. an EP not registered requesting enter in the domain) and lowest priority to pre-registrations. The newest pre-registration request may have the highest priority among the nodes with lowest priority.

Furthermore, as indicated above, there may be a need that all pre-registered EPs renew their pre-registration from time to time. In case an AP requires to free resources for a pre-registered node, it will choose the one with oldest pre-registration timestamp priority.

To summarize, a communication system, method and apparatus have been described, that enable combined illumination and communication of data (e.g. LiFi), fast handover can be achieved by having neighboring access point announce themselves using very short frames, that get picked up by user devices that detect the identity of a neighbor access point and then communicate this to the current access point to share information on the user device with its neighbor access point, so that the neighbor access point can be pre-configured to allocate resources (and/or synchronize).

While the invention has been illustrated and described in detail in the drawings and foregoing description, such illustration and description are to be considered illustrative or exemplary and not restrictive. The invention is not limited to the disclosed embodiments. The proposed detection and/or selection procedures can be applied to and possibly standardized in other types of wireless networks and with other types cells and/or reuse patterns.

For example, in many protocols, a beacon is sent at the start of a frame cycle. The beacon may not only indicate the start of the frame, but also other information like an identifier of an AP (e.g. a coordinator in IEEE802.15.7 terms) and information for the construction and usage of the rest of the frame.

In particular, the invention is not limited to the ITU-T G.9961, ITU-T G.9960, and ITU-T G.9991 network environment. The proposed shortened frames for presence advertisement may as well be used in network environments according to IEEE 802.15.7, where the concept of a beacon frame is applied at the start of a superframe. These beacon frames could be shortened to be limited to a medium-access-control header (MHR) in which the addressing fields contain the source address. As an example, a shortened beacon (S-beacon) could be used in addition to a normal beacon. S-beacons may then occur in a S-beacon period which then corresponds to the common channel (CC) explained above.

Moreover, the above sample embodiments are based on a time division of available channels. However, frequency division may be used in other types of network environments. A control channel may therefore also be established by using a frequency different from the that used for data (e.g. D-channel of the Integrated Services Digital Network (ISDN)). So, in principle, the common channel (CC) described in connection with the above sample embodiments may also occur at a different frequency (e.g. an out-of-band (OOB) channel with limited bandwidth).

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. The foregoing description details certain embodiments of the invention. It will be appreciated, however, that no matter how detailed the foregoing appears in the text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfill the functions of several items recited in the claims. The mere fact that certain measures are recited in mutually different dependent claims does not indicate that a combination of these measures cannot be used to advantage.

The described operations like those indicated in FIGS. 6 and 7 can be implemented as program code means of a computer program and/or as dedicated hardware of the receiver devices or transceiver devices, respectively. The computer program may be stored and/or distributed on a suitable medium, such as an optical storage medium or a solid-state medium, supplied together with or as part of other hardware, but may also be distributed in other forms, such as via the Internet or other wired or wireless telecommunication systems.

The invention claimed is:

1. An apparatus for fast handover in an optical multi-cell communication system for use in an access point, the apparatus being configured for:
   advertising presence of the access point in an optical multi-cell communication system by transmitting shortened frames without a payload portion in an allocated pre-defined part of a common channel of a frame cycle of a link layer or physical layer protocol, wherein the shortened frame contains an identifier of the advertising access point;
   pre-registering an end point,
   reserving transmission resources of the access point for the end point, and
   transmitting an acceptance message which includes timing information of the reserved transmission resources and an endpoint identifier to the end point, in response to a pre-registration request received from the end point.

2. The apparatus of claim 1, wherein the apparatus is configured for transmitting the shortened frame in every frame cycle.

3. The apparatus of claim 1, wherein the apparatus is configured for transmitting the shortened frame in the common channel and a default frame for medium access planning followed by an active frame for medium access planning in a different channel of the frame cycle.

4. The apparatus of claim 1, wherein the apparatus is configured for:
   prioritizing reservation of resources by allocating a higher priority to end points already registered at the access point and to non-registered end points requesting entry in a domain of the access point and a lower priority to a pre-registrations of end points, and wherein a higher priority is allocated to a newer pre-registration request than to an older pre-registration request.

5. The apparatus of claim 1, wherein the acceptance message comprises an endpoint identifier of the end point assigned by the access point.

6. The apparatus of claim 1, wherein the apparatus is configured for removing the pre-registration of the end point at the access point after a predetermined time period.

7. The apparatus of claim 1, wherein the apparatus is configured for prioritizing reservation of transmission resources by allocating a higher priority to end points already registered at the access point and to non-registered end points requesting entry in a domain of the access point and a lower priority to a pre-registrations of end points, wherein a higher priority is allocated to a newer pre-registration request than to an older pre-registration request.

8. The apparatus of claim 1, wherein the shortened frame is restricted to a preamble and a header which contains an identifier of the advertising access point.

9. The apparatus of claim 1, wherein the common channel of the shortened frame is separated from normal data traffic in the frame cycle.

10. An access point for providing access to an optical multi-cell communication system, the access point comprising an apparatus as claimed in claim 1.

11. A luminaire for an illumination system, the luminaire comprising at least one access point as claimed in claim 10.

12. A system for fast handover in an optical multi-cell communication system, comprising:
    a plurality of access points according to claim 10.

13. A method of allowing a fast handover in an optical multi-cell communication system by an access point, the method comprising the access point:
    advertising presence of the access point in an optical multi-cell communication system by transmitting shortened frames without a payload portion in an allocated pre-defined part of a common channel of a frame cycle of a link layer or physical layer protocol, wherein the shortened frame contains an identifier of the advertising access point
    pre-registering an end point,
    reserving transmission resources of the access point for the end point, and
    transmitting an acceptance message which includes timing information of the reserved transmission resources and an endpoint identifier to the end point, in response to a pre-registration request received from the end point.

14. The method of claim 13, the method comprising the access point:
    prioritizing reservation of resources by allocating a higher priority to end points already registered at the access point and to non-registered end points requesting entry in a domain of the access point and a lower priority to a pre-registrations of end points, and wherein a higher priority is allocated to a newer pre-registration request than to an older pre-registration request.

15. A non transitory computer readable medium comprising instructions for performing the method of claim 13 when run on a computer device of an access point.

* * * * *